United States Patent
Berman et al.

(10) Patent No.: US 8,939,297 B2
(45) Date of Patent: Jan. 27, 2015

(54) SPORT BOARD DISPLAY DEVICE

(71) Applicants: Kenneth M. Berman, Sebastopol, CA (US); Clare Monteschio, Sebastopol, CA (US)

(72) Inventors: Kenneth M. Berman, Sebastopol, CA (US); Clare Monteschio, Sebastopol, CA (US)

( * ) Notice: Subject to any disclaimer, the term of this patent is extended or adjusted under 35 U.S.C. 154(b) by 0 days.

(21) Appl. No.: 14/042,986

(22) Filed: Oct. 1, 2013

(65) Prior Publication Data

US 2014/0027594 A1  Jan. 30, 2014

Related U.S. Application Data

(60) Provisional application No. 61/719,754, filed on Oct. 29, 2012.

(51) Int. Cl.
| | |
|---|---|
| *A47F 7/00* | (2006.01) |
| *F16M 13/02* | (2006.01) |
| *A63C 5/03* | (2006.01) |
| *A63C 11/02* | (2006.01) |

(52) U.S. Cl.
CPC .................. *F16M 13/02* (2013.01); *A63C 5/03* (2013.01); *A63C 11/028* (2013.01)
USPC ........................................ 211/85.7; 211/70.5

(58) Field of Classification Search
USPC .......... 211/85.7, 70.5, 87.01, 89.01, 86.01, 4; 248/317, 339, 340, 343
See application file for complete search history.

(56) References Cited

U.S. PATENT DOCUMENTS

| | | | | |
|---|---|---|---|---|
| 4,878,585 | A |    | 11/1989 | Orestano |
| 5,014,955 | A | * | 5/1991  | Thompson ................. 248/309.1 |
| 5,120,012 | A | * | 6/1992  | Rosenau ....................... 248/201 |
| D342,637  | S |    | 12/1993 | Smith |
| 5,301,818 | A |    | 4/1994  | Dix |
| 5,305,897 | A |    | 4/1994  | Smith |
| 5,582,044 | A | * | 12/1996 | Bolich ............................. 70/58 |
| 5,826,908 | A | * | 10/1998 | McBride ....................... 280/814 |
| 5,833,078 | A | * | 11/1998 | York ............................ 211/70.5 |
| 6,196,397 | B1 | * | 3/2001 | Maher .......................... 211/85.7 |
| 6,263,709 | B1 | * | 7/2001 | Kemery et al. .................... 70/14 |
| 6,293,412 | B1 |    | 9/2001  | Draper |
| 6,640,978 | B2 | * | 11/2003 | Reiser et al. ...................... 211/4 |
| 6,712,226 | B1 |    | 3/2004  | Williams |
| 6,938,864 | B2 |    | 9/2005  | Simonian et al. |
| 6,942,094 | B2 | * | 9/2005 | Coulson ..................... 206/315.1 |
| 7,014,052 | B2 |    | 3/2006  | Dettorre |
| 7,896,175 | B1 | * | 3/2011 | Corr et al. .................. 211/86.01 |
| 7,950,535 | B1 |    | 5/2011  | Schmid |
| 8,123,051 | B2 |    | 2/2012  | Johnson |
| 2002/0060194 | A1 | * | 5/2002 | Reiser et al. ...................... 211/4 |
| 2004/0108286 | A1 | * | 6/2004 | Coulson ........................ 211/85.7 |
| 2007/0125731 | A1 | * | 6/2007 | Waterman ................... 211/85.7 |
| 2008/0083684 | A1 | * | 4/2008 | Pfeiffer ........................ 211/85.7 |
| 2012/0006766 | A1 | * | 1/2012 | Mackay, Jr. ........................ 211/4 |

* cited by examiner

*Primary Examiner* — Patrick Hawn

(57) ABSTRACT

A device for displaying a sport board, such as a skateboard, on a flat surface, such as a wall or an angled ceiling, wherein the board may be displayed at any angle to maximize the artistic impact of the design. The display device includes a mounting plate, a spacer to accommodate the curvature of the sport board, and a board mounting bracket designed to accept bolts that are screwed into the opposite ends of the existing holes on a sport board deck.

4 Claims, 5 Drawing Sheets

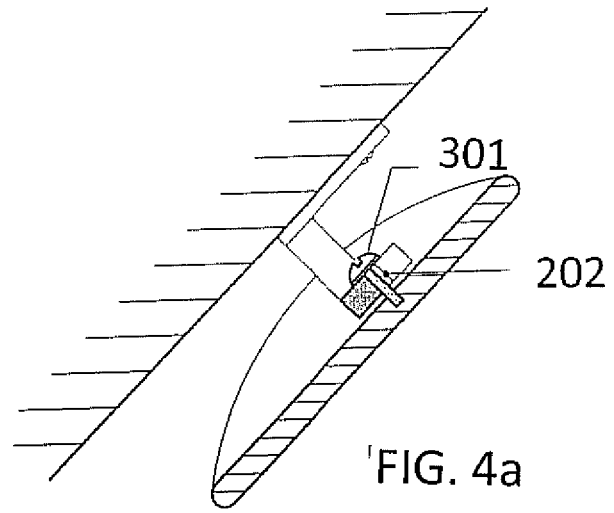
FIG. 4a
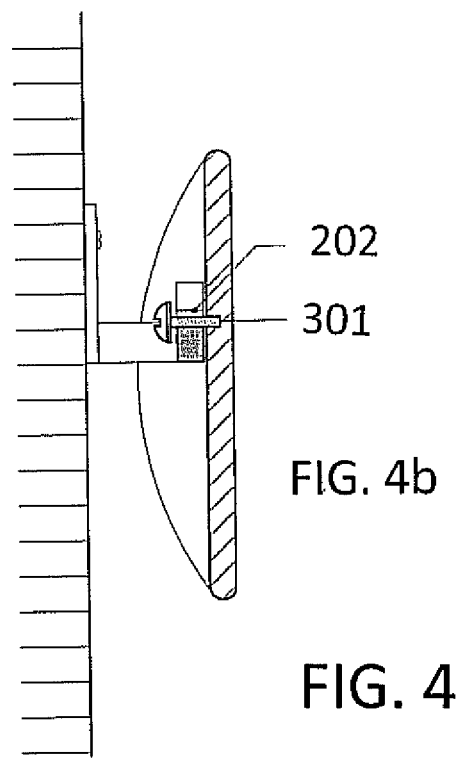
FIG. 4b
FIG. 4

SPORT BOARD DISPLAY DEVICE

CROSS-REFERENCES TO RELATED APPLICATIONS

This application claims priority to provision application No. 61/719,754 filed Oct. 29, 2012, the entire disclosure of which is incorporated herein by this reference.

STATEMENT REGARDING FEDERALLY SPONSORED RESEARCH OR DEVELOPMENT

Not Applicable.

REFERENCE TO SEQUENCE LISTING, A TABLE, OR A COMPUTER PROGRAM LISTING COMPACT DISC APPENDIX

Not Applicable.

BACKGROUND OF THE INVENTION

1. Field of the Invention

Generally, the present invention relates to a display device. More particularly, the present invention relates to a display device for displaying board shaped devices such as skateboards, snowboards, and wakeboards for retail sales or artistic presentation 2. Description of the Related Art For over forty years, skateboarding has contributed to popular culture. Throughout its evolution as a hobby and sport, the functional design of the skateboard has generally remained the same. Typically, a skateboard is a thin oblong object with slightly curved ends and with a set of four wheels attached via trucks that is ridden on a flat hard surface such as asphalt or concrete. Similar shaped sport boards have been developed for use on other mediums such as snowboards that are ridden on snow, and wakeboards that are ridden on water while being towed behind a motor boat. For snow and water applications, the wheels are replaced by strap or boot attachment devices on the tops of the boards.

These types of sport boards share a similar shape and all such devices have evolved as a display medium for graphics and artistic designs. Specifically, artwork is silkscreened or otherwise applied to the surface of the board and the boards are then displayed with or without the functional straps or wheel attachments as decorative artwork. There are many known devices for storage of these sport boards, but most current storage devices do not provide for display of the artwork, and specifically do not provide flexibility for display in a variety of orientations that allow artistic presentation of the artwork. Generally, the artwork is designed so that it may be best appreciated with the board oriented in a vertical or horizontal position, however, for artistic purposes, displaying the boards at various angles can create a more interesting and aesthetically pleasing presentation.

A discussion of the related art of which the present inventor is aware, and its differences and distinctions from the present invention, is provided below.

U.S. Pat. No. 6,938,864 discloses a display device comprising an S-shaped hook that mounts to a wall. A sport board can either be installed in the slots created by the S-shape or attached with screws on the outside of the hook. When the hook is adapted for use in a wall-mounted configuration, the device is attached to a wall or other vertical surface and the board is attached to the bracket with screws on one end only. This device, however, does not allow for easy installation and removal of the sport board as screws must be installed for attachment. In addition, the attachment is only at one end of the board. With this configuration, installation on an angled surface, such as an angled ceiling, or at a non-vertical angle, would result in strong angled forces due to the weight of the cantilevered board on the installation bolt and the mounting holes for the sport board, potentially resulting in damage to the board or mounting device.

Similarly, U.S. Pat. No. 7,950,535 discloses a display device for multiple skateboards wherein the skateboards are attached with screw mechanisms at only one end of the board. Because the attachment point is at only one end of the board, the weight of the board in a non-vertical display orientation could result in damage to the board.

U.S. Patents such as D342637, U.S. Pat. Nos. 6,293,412, and 5,305,897, disclose hooks and mechanisms for storage of skate boards that have wheels installed, and do not display the artwork on the wheel side of the board.

The present invention resolves the problems associated with these prior inventions by allowing display of the sport board without its functional wheels or attachment straps in a vertical, horizontal, or angled orientation to maximize artistic display of the graphic or artistic design. Because the attachment points are at the two ends of the board, there is greater stability for display at any angle. The invention can be used to display sport boards on a vertical wall, on an angled ceiling, or on a pegboard such as those that may be used for retail displays. The option to install on a pegboard also allows flexibility for easily re-orienting the sport board display device for different boards or to change displays in a retail environment. In addition, whereas prior art display devices generally result in a cantilevering of the board relative to the wall or other mounting surface, the present invention maintains the board in a position that is substantially parallel to the wall or other mounting surface to improve visibility and presentation of the artistic design.

BRIEF SUMMARY OF THE INVENTION

The present invention is a sport board display device that can be mounted in a variety of orientations on a wall or other surface to maximize artistic display of the artwork on the surface of the board. The present invention comprises a surface mounting plate, a spacer, a board mounting bracket, and two attachment bolts. The surface mounting plate is a flat element that has a plurality of pre-drilled holes in a standard-spaced pattern. The pre-drilled holes allow easy installation with screws or nails on a flat mounting surface such as a wall or angled ceiling. The spacer provides clearance from the mounting surface that accommodates the curvature of the sport board and prevents contact of the curved board ends with the wall or other mounting surface. One attachment bolt is installed at each end of the sport board that is to be displayed by screwing it partially into one of the pre-existing truck mounting or strap attachment holes. The bolts are screwed in only far enough to be firmly retained, leaving a space between the bolt head and the board. The board mounting bracket has two keyholes that are spaced to accommodate the bolts and designed to ensure secure attachment of the sport board to the sport board display device. After attachment of the sport board display device to the wall or other surface, the sport board is easily installed and removed from the sport board display device by sliding the attachment bolts in and out of the keyholes on the board mounting bracket.

In a preferred embodiment, the keyholes on the board mounting bracket are spaced to align with standard skateboard truck mounting holes. In other embodiments, the keyholes on the board mounting bracket are spaced for the standard mini-skateboard truck mounting holes or the standard long-skateboard truck mounting holes. In yet another embodiment, the board mounting plate keyholes are spaced to accommodate non-standard sized boards, or the attachment strap locations of snowboards or wakeboards.

BRIEF DESCRIPTION OF THE SEVERAL VIEWS OF THE DRAWINGS

A more complete understanding of the present invention may be derived by referring to the detailed description and claims when considered in connection with the figures, wherein like reference numbers refer to similar items throughout the figures and:

FIG. 4 is a cross-section through one of the attachment points for the skateboard, shown with a skateboard installed and illustrating how the keyholes in the board mounting plate securely hold the skateboard in place when installed on a vertical (FIG. 4b) or angled (FIG. 4a) surface.

DETAILED DESCRIPTION OF THE INVENTION

Figure 1:
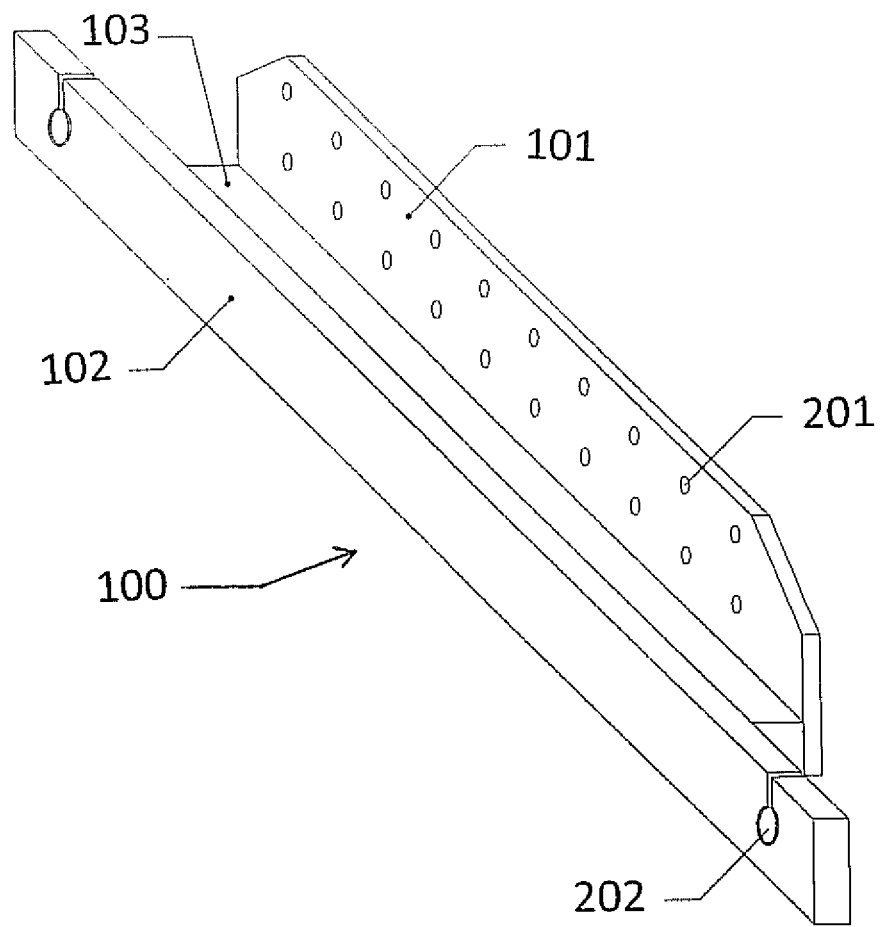
FIG. 1 is a perspective view of a preferred embodiment of the present invention.

In the following detailed description of the invention, reference is made to the accompanying drawings which form a part of the disclosure and, which show by way of illustration, and not of limitation, specific embodiments by which the invention may be practiced. The drawings, the foregoing discussion, and the following description are exemplary and explanatory only, and are not intended to limit the scope of the invention or its application in any manner.

The present invention is a sport board display device 100 that allows flexibility for orientation of the sport board to maximize artistic presentation of the artwork on the surface of the board. The sport board display device 100 can be constructed from any structurally sound material and may consist of one or more pieces made of a moldable or extrudable material such as plastic or aluminum, or two or more pieces of such material as plastic, wood, metal, or the like, that are attached firmly together with glue or fasteners. In a preferred embodiment, the components of the present invention are constructed from ABS plastic, or other plastic suitable for 3-D printing or cutting on a CNC machine.

In a preferred embodiment, the surface mounting plate 101 is made of ABS plastic with a thickness of approximately ¼ inch, that is pre-drilled or formed with a plurality of holes 201 spaced on a one-inch spacing pattern. In an alternate embodiment, the surface mounting plate 101 may be made from a single piece of commercially available ¼ inch thick pegboard with a standard one inch spaced hole pattern of 9/32 inch diameter peg holes 201. In yet another embodiment, the surface mounting plate 101 may be made from other plastic, metal, wood or other wood product. The mounting hole 201 spacing pattern is aligned such that it is substantially parallel with the length of the surface mounting plate 101. By thus aligning the mounting hole 201 spacing pattern, the sport board display device 100 can be easily mounted to an existing pegboard in a retail sales environment with screws or on pegs in a vertical or horizontal mounting position, or at angles of 36.87 or 53.13 degrees from vertical when holes 201 on five inch increments are used for mounting.

The height of the surface mounting plate 101 is sized such that the mounting holes 201 extend sufficiently above the spacer 103 to allow easy installation to the wall or other mounting surface. The sport board display device 100 is attached to the mounting surface with screws or nails, or by sliding it onto pegs installed on the mounting surface. In alternate embodiments, the number of mounting holes 201 may be reduced to a minimum of two holes. In that case, the holes 201 are preferably separated by increments of five inches such that they may be mounted to a standard one-inch spaced pegboard. The five inch increment allows display orientation on a standard pegboard in either vertical, horizontal, 36.87 degrees from vertical, or 53.13 degrees from vertical.

Figure 3:
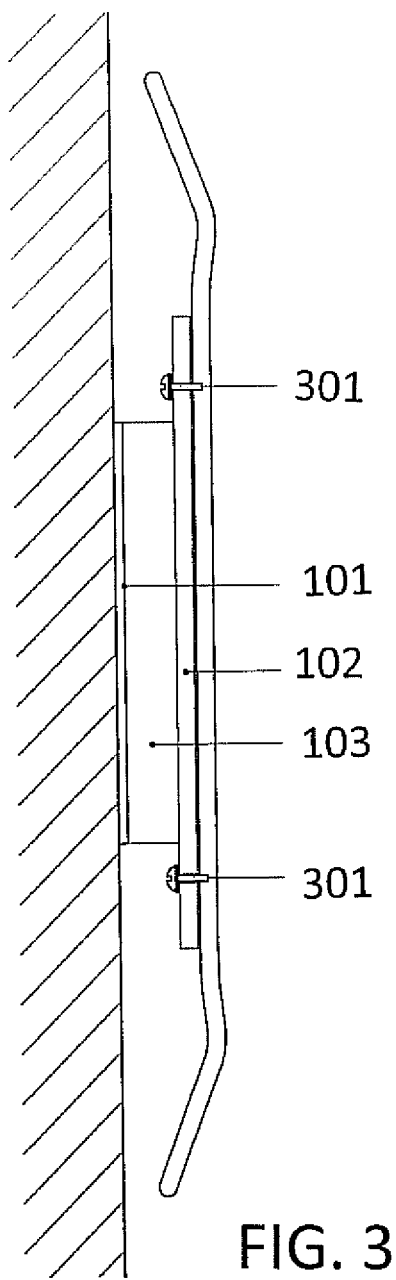
FIG. 3 is a side view of the present invention as installed in a vertical orientation with a skateboard installed and showing how the sport board display device maintains clearance between the curved ends of the skateboard and the wall or other mounting surface.
Figure 5:
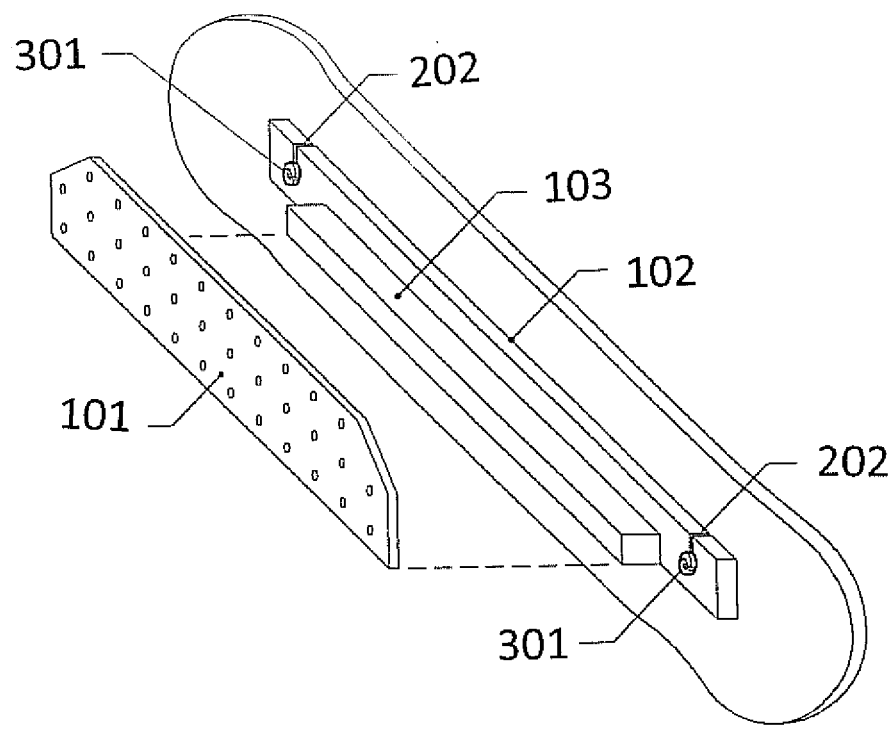
FIG. 5 is a perspective rear view of the present invention with a skateboard installed.

In a preferred embodiment, a spacer 103 made of ABS plastic is firmly attached to the surface mounting plate 101. The spacer 103 is functionally sized to accommodate the curvature of the sport board to be displayed (see FIG. 3). Specifically, it is sized such that it holds the sport board far enough from the mounting surface to prevent contact, while keeping the sport board as close to the mounting surface as possible to minimize cantilever forces when mounted horizontally or at an angle. In a preferred embodiment, the spacer 103 is the same length as the surface mounting plate 101 to ensure maximum strength and stability. In other embodiments, the spacer 103 is made of other structurally sound materials such as other plastic, metal, or wood, or the spacer 103 and surface mounting plate 101 are a single piece.

In a preferred embodiment, the board mounting bracket 102 is made of ABS plastic and is firmly attached to the spacer 103. The board mounting bracket 102 extends beyond the length of the spacer 103 and includes two keyholes 202 that are spaced to receive bolts 301 attached to opposite ends of the sport board. The extension beyond the spacer 103 is sufficient to allow clearance for the bolt heads 301. In other embodiments, the board mounting bracket 102 is made of other structurally sound materials such as other plastic, metal or wood, or the spacer 103 and board mounting bracket 102 are a single piece, or the spacer 103, board mounting bracket 102, and surface mounting plate 101 are all made from a single piece.

Figure 2:
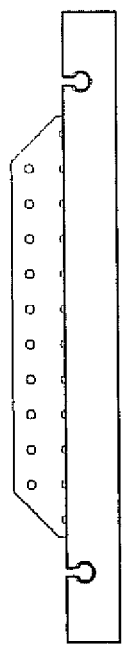
FIG. 2 is a front view of the present invention shown in various orientations for display of the artwork in vertical (FIG. 2a), horizontal (FIG. 2b) or angled (FIG. 2c) orientations.
Figure 2:
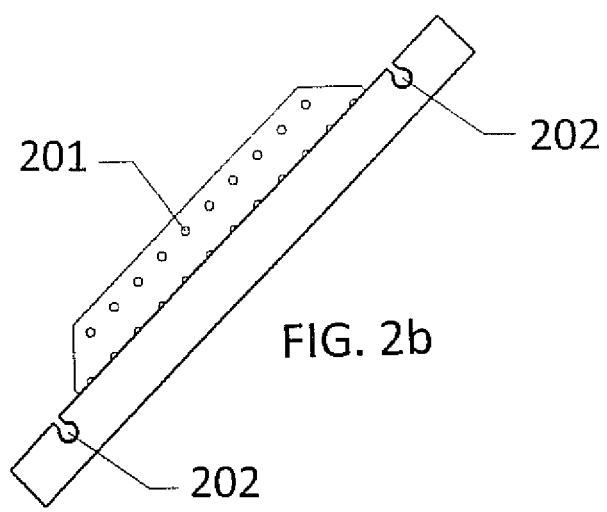
Figure 2:
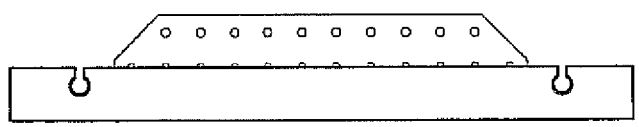

The keyholes 202 consist of a round section large enough to accommodate an appropriate sized bolt 301, and a smaller section designed to receive the shaft of the bolt 301. The larger round section is smaller than the diameter of the head of the attaching bolt 301. Two bolts 301 are installed in the sport board such that there is a space between the bottom of the bolt 301 head and the sport board sufficient to accommodate the width of the board mounting bracket 102. The sport board is then mounted to the board mounting bracket 102 by sliding the bolt 301 shafts into the keyholes 202. The design of the keyholes 202 allows the board display device to be installed on a vertical mounting surface at any angle (see FIG. 2). The force of gravity holds the shaft of the bolts 301 below the smaller section of the keyholes 202 such that the smaller portion of the keyhole 202 retains the sport board on the board mounting bracket 102. In addition, because the head of the bolt 301 is larger than the larger round section of the keyhole 202, the sport board can be displayed on a surface that is not perfectly vertical such as an angled ceiling, while still holding the sport board firmly in place (see FIG. 4a).

In a preferred embodiment, the keyholes 202 are spaced such that they match the lengthwise distance between the mounting holes for trucks on each end of a skateboard. This allows mounting of the skateboard using the existing holes in the skateboard. In other embodiments, the keyholes 202 are spaced for the lengthwise distance between the truck mounting holes on each end of mini-skateboards, or long-skateboards. In yet other embodiments, the keyholes 202 are spaced for dimensions of snowboard or wakeboard attachment strap locations.

In use, when a sport board is inserted onto the sport board display device 100, the artwork on the sport board is displayed without obstruction, and the sport board display device 100 is not visible. The structure of the sport board display device holds the board substantially parallel to the mounting surface so that it may be displayed virtually anywhere. For example, sport boards can be displayed on a wall, in a hallway, or on an angled ceiling Many modifications and variations of this invention may be made without departing from its spirit and scope, as will be appreciated by those skilled in the art. For example, instead of attaching bolts directly to the sport board, the bolts could be attached to a device designed to hold the sport board. The specific embodiments described herein are offered by way of example only. The embodiments were chosen and described in order to best explain the principles of the invention and its practiced applications.

We claim:

1. A sport board display device for displaying a sport board having a bottom surface and two curved ends and a first and a second plurality of truck or strap attachment holes, the first plurality of holes located substantially on one end of the sport board and the second plurality of holes located substantially on the other end of the sport board, the display device comprising:
    a surface mounting plate attached to a mounting surface;
    a spacer extending from said surface mounting plate to a distance such that when the sport board is in a display position the sport board does not touch the mounting surface;
    a board mounting bracket extending at a right angle from said spacer such that it is substantially parallel to said surface mounting plate, wherein said board mounting bracket has two keyholes that are perpendicular to said surface mounting plate and each keyhole having an entry slot extending from a top side of the board mounting bracket, the keyholes are spaced to substantially match the longitudinal distance between a first hole of the first plurality of truck or strap attachment holes and a second hole of the second plurality of truck or strap attachment holes of said sport board;
    and two bolts screwed into the first hole and the second hole, respectively, wherein bolt heads are larger than the keyholes and bolt shafts are smaller than the keyhole slots such that the bolt shafts each pass through a keyhole when the sport board is in the display position.

2. The sport board display device of claim 1, wherein said surface mounting plate has at least two holes spaced to substantially match a hole pattern of a pegboard.

3. A sport board display device comprising:
    a sport board having a bottom surface and two curved ends and a first and a second plurality of truck or strap attachment holes, the first plurality of holes located substantially on one end of the sport board and the second plurality of holes located substantially on the other end of the sport board;
    a surface mounting plate attached to a mounting surface;
    a spacer extending from said surface mounting plate to a distance such that when the sport board is in a display position the sport board does not touch the mounting surface;
    a board mounting bracket extending at a right angle from said spacer such that it is substantially parallel to said surface mounting plate, wherein said board mounting bracket has two keyholes that are perpendicular to said surface mounting plate and each keyhole having an entry slot extending from a top side of the board mounting bracket, the keyholes are spaced to substantially match the longitudinal distance between a first hole of the first plurality of truck or strap attachment holes and a second hole of the second plurality of truck or strap attachment holes of said sport board;
    and two bolts screwed into the first hole and the second hole, respectively, wherein bolt heads are larger than the keyholes and bolt shafts are smaller than the keyhole slots such that the bolt shafts each pass through a keyhole when the sport board is in the display position, wherein the sport board is a skateboard, a long board, a mini skateboard, a snowboard, or a wakeboard.

4. The sport board display device of claim 3, wherein said surface mounting plate has at least two holes spaced to substantially match a hole pattern of a pegboard.

* * * * *